United States Patent
Vohra et al.

(10) Patent No.: US 8,281,071 B1
(45) Date of Patent: Oct. 2, 2012

(54) SYSTEMS AND METHODS FOR MANAGING CLUSTER NODE CONNECTIVITY INFORMATION

(75) Inventors: Taher Vohra, Sunnyvale, CA (US); Abhay Singh, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 423 days.

(21) Appl. No.: 12/714,434

(22) Filed: Feb. 26, 2010

(51) Int. Cl.
  *G06F 12/16* (2006.01)
(52) U.S. Cl. ......... 711/114; 711/156; 711/161; 711/162
(58) Field of Classification Search .................. 711/114, 711/156, 161, 162
  See application file for complete search history.

(56) References Cited

U.S. PATENT DOCUMENTS

| | | | |
|---|---|---|---|
| 7,900,002 B2 * | 3/2011 | Lyon | 711/161 |
| 2005/0138517 A1 * | 6/2005 | Monitzer | 714/746 |
| 2005/0268151 A1 * | 12/2005 | Hunt et al. | 714/4 |
| 2007/0220372 A1 * | 9/2007 | Chen | 714/52 |
| 2007/0250671 A1 * | 10/2007 | Lyon | 711/162 |
| 2009/0282116 A1 * | 11/2009 | Hammons et al. | 709/206 |

\* cited by examiner

*Primary Examiner* — John Lane
(74) *Attorney, Agent, or Firm* — Advantedge Law Group

(57) ABSTRACT

A computer-implemented method for managing cluster node connectivity information. The method may include maintaining a set of cluster nodes of a clustered application. The method may also include, for each node in a set of cluster nodes, determining a connectivity state of the cluster node and transmitting, from the cluster node to non-volatile Random Access Memory ("RAM") of a cluster disk, connectivity information that indicates the connectivity state of the cluster node. The method may further include accessing, from a remote system, the non-volatile RAM of the cluster disk to retrieve connectivity information of one or more cluster nodes from the set of cluster nodes. The method may include using the connectivity information to inform the remote system of the connectivity state of the one or more cluster nodes. Various other methods, systems, and computer-readable media are also disclosed.

20 Claims, 5 Drawing Sheets

SYSTEMS AND METHODS FOR MANAGING CLUSTER NODE CONNECTIVITY INFORMATION

BACKGROUND

Backup appliances that provide continuous data protection for a clustered application may need to know when a cluster node loses connectivity to the backup appliance. Disconnection of a cluster node may result in some Input and/or Output ("I/O") on the node not being protected, and detection of this missed I/O condition (i.e., blackout) may be critical for correct functioning of the backup appliance. Traditional solutions may address this problem by maintaining the state of connectivity of each node in the cluster at some cluster-wide central location. The central location could be a cluster-accessible storage device (e.g., a file or a block on shared storage device). The backup appliance may detect the connectivity state of each cluster node by periodically reading from the central storage device.

Unfortunately, provisioning a cluster-wide accessible storage device is problematic for a variety of reasons. For example, if the central location is a data store owned by the cluster monitor, the backup appliance may have a problem reading the data store since the data store may be cluster monitor proprietary and interfaces to read the data store may be highly specific to the particular cluster monitor.

Another challenge associated with provisioning cluster-wide accessible storage is that new storage resources (e.g., spindles, ports, mapping entries, etc.) may need to be allocated by a network administrator when the network administrator is adding the backup appliance to an already-configured application cluster. Furthermore, the extra storage resource allocated by the network administrator may need to comply with one or more of a variety of constraints: 1) the storage resource should be connected to all cluster nodes; 2) the storage resource should originate from the same storage controller as the production storage; 3) the storage resource needs to be configured for a specific transport; 4) the storage resource needs to support a specific filesystem; and/or 5) the storage resource needs to be a specified minimum size. Complying with one or more of these constraints to provide a storage device for maintaining connectivity information may be cumbersome and problematic. What is needed, therefore, is a more efficient and effective mechanism for managing connectivity information of cluster nodes.

SUMMARY

As will be described in greater detail below, the instant disclosure generally relates to systems and methods for managing cluster node connectivity information. For example, a system for managing cluster node connectivity information may include a cluster monitor programmed to manage a set of cluster nodes of a clustered application. The system may also include, in each node in the set of cluster nodes, a connectivity monitor programmed to determine a connectivity state of the cluster node and a splitter driver programmed to transmit, from the cluster node to non-volatile Random Access Memory ("RAM") of a cluster disk, connectivity information that indicates the connectivity state of the cluster node. The system may include an access module programmed to access, from a remote system, the non-volatile RAM of the cluster disk to retrieve connectivity information of one or more cluster nodes from the set of cluster nodes. The access module may also be programmed to use the connectivity information to inform the remote system of the connectivity state of the one or more cluster nodes.

In some embodiments, the connectivity monitor may be programmed to determine the connectivity state of the cluster node by determining whether the cluster node has an active connection with a data protection system. In such embodiments, the data protection system may include the access module, which may be programmed to use the connectivity information to determine whether the cluster node has an active connection with the data protection system. Alternatively, the connectivity monitor may be programmed to determine the connectivity state of the cluster node by determining whether the cluster node is an active node of the clustered application. In such embodiments, the cluster monitor may access the connectivity information stored in the non-volatile RAM of the cluster disk to determine whether the cluster node is an active node of the clustered application.

The splitter driver may transmit connectivity information in a variety of contexts. For example, the splitter driver may be programmed to transmit the connectivity information from the cluster node to the non-volatile RAM of the cluster disk by executing a Small Computer System Interface ("SCSI") command on the cluster disk. The splitter driver may execute the SCSI command on the cluster disk by generating a dummy initiator identifier that comprises the connectivity information, including the dummy initiator identifier in a TransportID field of a SCSI persistent reservation keys command, and executing the SCSI persistent reservation keys command to the cluster disk.

The splitter driver may be programmed to trap the SCSI command as the SCSI command is sent from a cluster monitor to the cluster disk. In such embodiments, the splitter driver may be programmed to include the dummy initiator identifier in the SCSI persistent reservation keys command by modifying the trapped SCSI command to include the dummy initiator identifier. Additionally or alternatively, the splitter driver may be programmed to generate the SCSI persistent reservation keys command.

In some embodiments, the splitter driver may be programmed to execute the SCSI command on the cluster disk by generating a persistent reservation key that comprises the connectivity information and registering the persistent reservation key with the cluster disk. Alternatively, the splitter driver may be programmed to transmit the connectivity information from the cluster node to the non-volatile RAM of the cluster disk by storing the connectivity information in the log storage section of the non-volatile RAM of the cluster disk.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
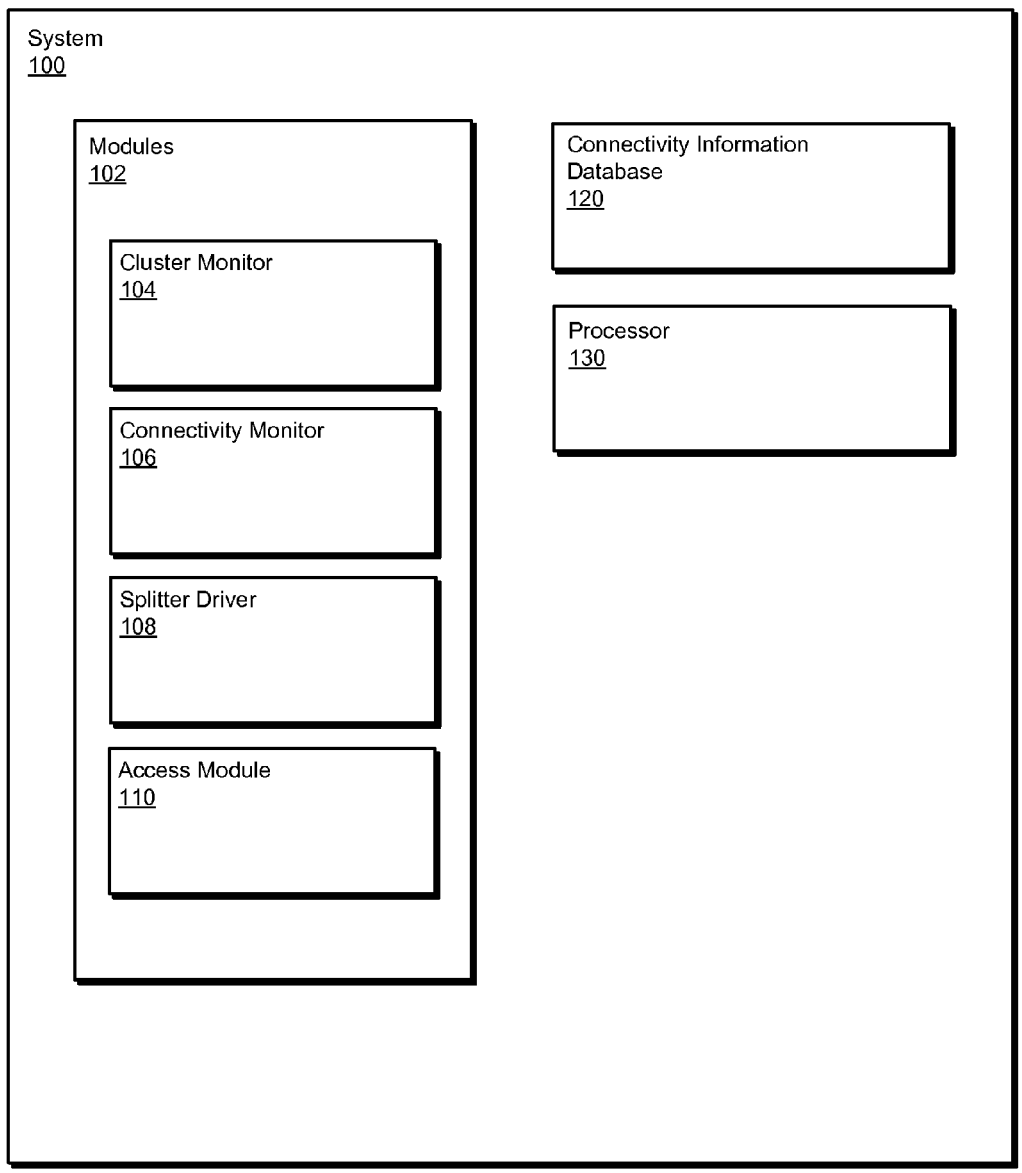
FIG. 1 is a block diagram of an exemplary system for managing cluster node connectivity information.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for managing cluster node connectivity information. Systems disclosed herein may determine a connectivity state of a cluster node (e.g., whether the cluster node has an active connection with a data protection appliance and/or with production storage). Such systems may then transmit information indicating the connectivity state of the node to non-volatile RAM of a cluster disk. A data protection appliance (or other system) may then access the non-volatile RAM of the cluster disk to retrieve the cluster node connectivity information.

Figure 2:
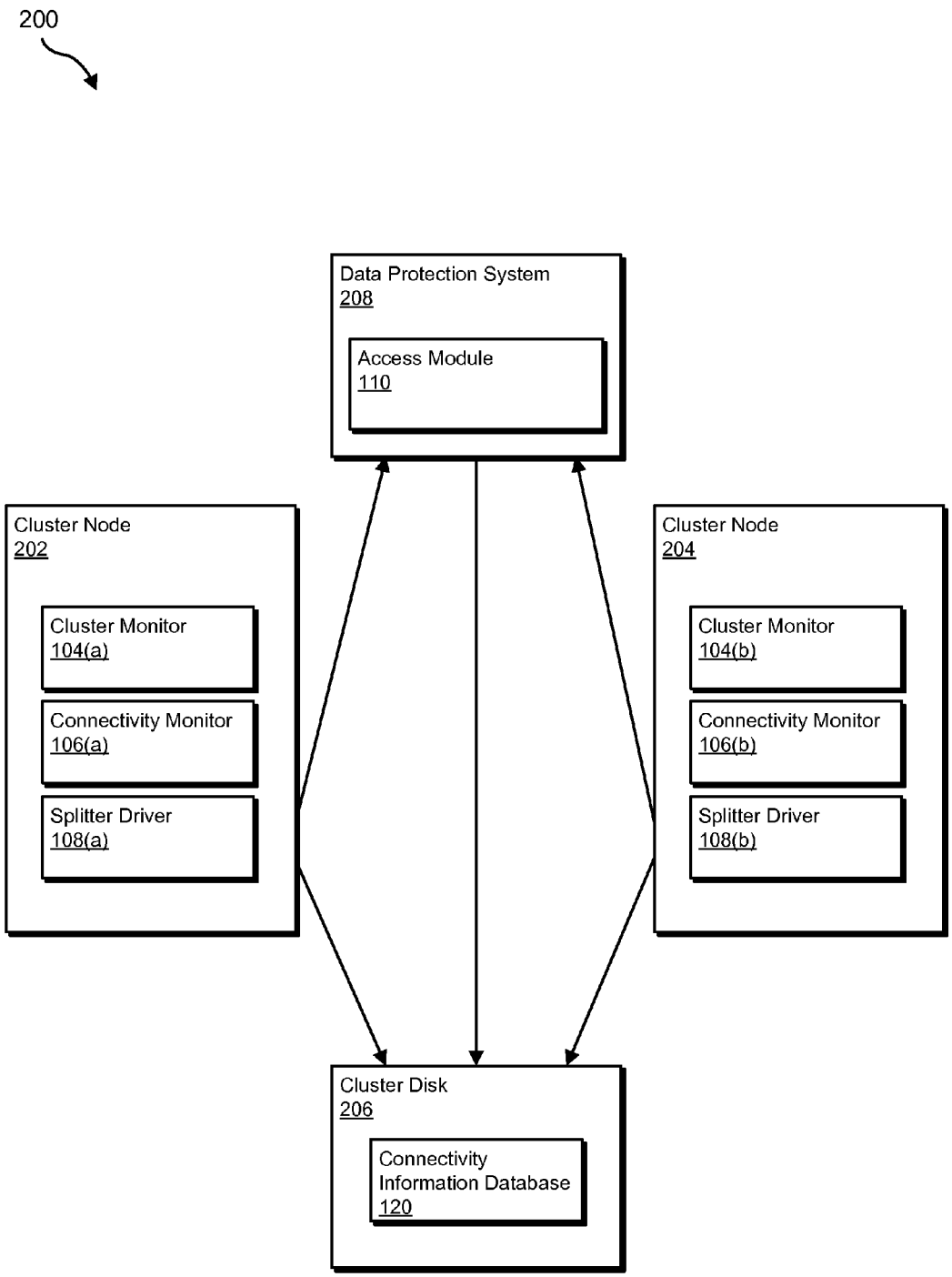
FIG. 2 is a block diagram of another exemplary system for managing cluster node connectivity information.

The following will provide, with reference to FIGS. 1-2, detailed descriptions of exemplary systems for managing cluster node connectivity information. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for managing cluster node connectivity information. As illustrated in this figure, exemplary system 100 may include one or more modules 102 for performing one or more tasks. For example, and as will be explained in greater detail below, exemplary system 100 may include a cluster monitor 104 programmed to manage a set of cluster nodes of a clustered application. Exemplary system 100 may also include a connectivity monitor 106 programmed to determine a connectivity state of the cluster node.

In addition, and as will be described in greater detail below, exemplary system 100 may include a splitter driver 108 programmed to transmit, from the cluster node to non-volatile Random Access Memory ("RAM") of a cluster disk, connectivity information that indicates the connectivity state of the cluster node. Exemplary system 100 may also include an access module 110 programmed to access, from a remote system, the non-volatile RAM of the cluster disk to retrieve connectivity information of one or more cluster nodes from the set of cluster nodes. The access module may be further programmed to use the connectivity information to inform the remote system of the connectivity state of the one or more cluster nodes. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as a processor 130, the devices illustrated in FIG. 2 (e.g., cluster node 202, cluster node 204, and/or data protection system 208), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include a connectivity information database 120. Connectivity information database 120 may represent portions of a single database or computing device or a plurality of databases or computing devices. Connectivity information database 120 may store connectivity information (e.g., information indicating whether a node is connected to a data protection appliance) for one or more cluster nodes.

Connectivity information database 120 may represent a portion of one or more computing devices, memory devices, data stores, or other data structures. For example, connectivity information database 120 may represent a portion of cluster disk 206 in FIG. 2 (e.g., connectivity information may be stored in non-volatile RAM of cluster disk 206), computing system 410 in FIG. 4, and/or portions of exemplary network architecture 500 in FIG. 5.

Exemplary system 100 in FIG. 1 may be deployed in a variety of ways. For example, all or a portion of exemplary system 100 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include cluster nodes 202 and 204 in communication with a cluster disk 206. System 200 may also include a data protection system 208 (e.g., a replication appliance, a continuous data protection appliance, etc.) in communication with cluster node 202, cluster node 204, and cluster disk 206. In some embodiments, the components of system 200 may communicate over a network. Examples of networks that provide communication between components of system 200 include, without limitation, an intranet, a wide area network (WAN), a local area network (LAN), a personal area network (PAN), the Internet, power line communications (PLC), a cellular network (e.g., a GSM Network), exemplary network architecture 500 in FIG. 5, or the like. In some embodiments, components of system 200 (e.g., cluster disk 206) are provided in a Storage Area Network ("SAN") configuration or any other suitable storage connectivity configuration.

Cluster nodes 202 and 204 generally represents any type or form of computing device capable of reading computer-executable instructions. As used herein, the term "cluster node" generally refers to any computing devices that is part of a cluster of linked computing devices. Examples of cluster nodes include, without limitation, laptops, desktops, servers, virtual machines, embedded systems, combinations of one or more of the same, exemplary computing system 410 in FIG. 4, or any other suitable computing device or system.

In the example shown in FIG. 2, cluster nodes 202 and 204 may represent a cluster. Clusters may also include more than two nodes. Clusters may be configured to provide high availability for applications (e.g., clusters may include redundant nodes that provide failover capabilities), provide load balancing, increase computation power, and/or provide file systems simultaneously mounted on multiple servers.

As shown in FIG. 2, cluster node 202 may include a cluster monitor 104(a), a connectivity monitor 106(a), and a splitter driver 108(a). Similarly, cluster node 204 may include a cluster monitor 104(b), a connectivity monitor 106(b), and a splitter driver 108(b). Splitter drivers 108(a) and (b) may capture writes from cluster nodes 202 and 204 to cluster disk 206 and may send the captured data to data protection system 208. Cluster disk 206 generally represents any type or form of computing device (e.g., a production Logical Unit Number ("LUN")) that is capable of communicating with cluster nodes and providing storage for a cluster, and data protection system 208 generally represents any type or form of computing system that is capable of providing one or more data protection services. Cluster disk 206 may include connectivity information database 120, and data protection system 208 may include access module 110.

Examples of data protection system 208 include, without limitation, backup appliances, replication appliances, continuous data protection appliances, and various other types of data protection appliances.

Data protection system 208 may need to know the connectivity status of cluster nodes 202 and 204 to data protection system 208 to determine whether all I/O between the cluster nodes and cluster disk 206 is being captured by data protection system 208. Cluster nodes 202 and 204 may provide such availability information by writing the availability information to non-volatile RAM of cluster disk 206, and data protection system 208 may access the connectivity information by accessing the non-volatile RAM of cluster disk 206. The discussion corresponding to FIG. 3 provides various examples of how non-volatile RAM of a cluster disk may be used to store connectivity information.

Figure 3:
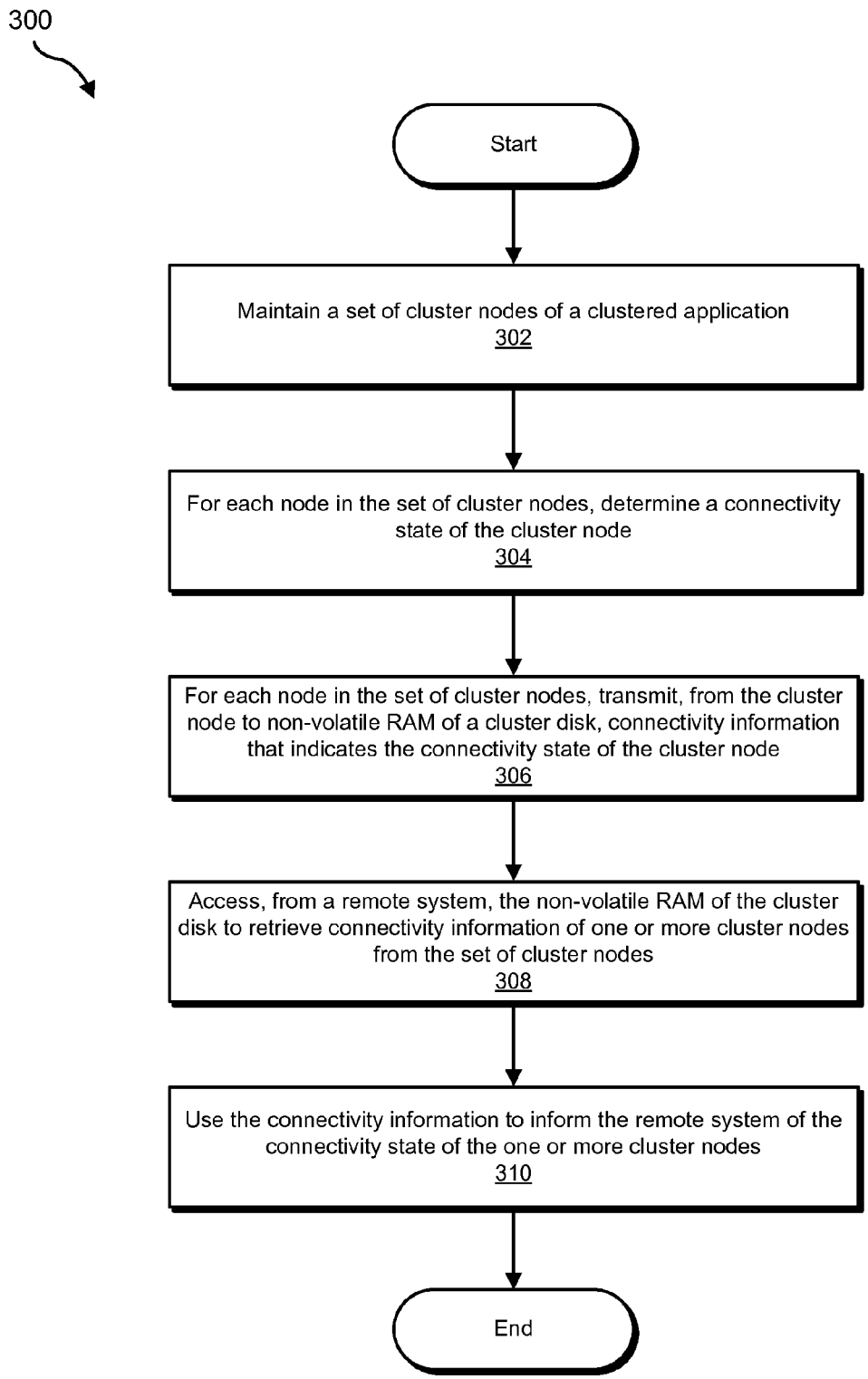
FIG. 3 is a flow diagram of an exemplary method for managing cluster node connectivity information.

FIG. 3 is a flow diagram of an exemplary computer-implemented method 300 for managing cluster node connectivity information. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

At step 302 in FIG. 3, one or more of the systems described herein may maintain a set of cluster nodes of a clustered application. For example, cluster monitor 104 in FIG. 1 (which may, as detailed above, represent a portion of cluster node 202 and/or cluster node 204 in system 200 in FIG. 2) may maintain a set of cluster nodes. As used herein, the phrase "cluster monitor" generally refers to any cluster software for managing cluster nodes. Examples of cluster monitors include VERITAS CLUSTER SERVER, MICROSOFT CLUSTER SERVER, LINUX SERVER CLUSTER, and/or any other suitable type of cluster software. Cluster monitors may provide high-availability clusters (e.g., clusters may be implemented for the purpose of improving availability of services and may operate having redundant nodes which are used to provide service when system components fail), load-balancing clusters (e.g., computers linked together to share computational workload or function as a single computer), computational clusters, and/or clusters that provide distributed file systems.

As noted, a cluster monitor may manage cluster nodes of a clustered application. Clustered applications include any suitable type of application that may be able to take advantage of cluster services. Examples of clustered applications include databases, web applications, and/or various other types of software applications.

At step 304 in FIG. 3, one or more of the systems described herein may, for each node in a set of cluster nodes, determine a connectivity state of the cluster node. For example, connectivity monitor 106 in FIG. 1 (which may, as detailed above, represent a portion of cluster node 202 and/or cluster node 204 in FIG. 2) may determine a connectivity state of a cluster node on which it is installed.

Connectivity monitor 106 may determine a connectivity state of a set of cluster nodes (i.e., one or more cluster nodes) in a variety of contexts. For example, connectivity monitor 106(a) may determine the connectivity state of cluster node 202 by determining whether cluster node 202 has an active connection with data protection system 208. Alternatively, connectivity monitor 106(a) may determine the connectivity state of cluster node 202 by determining whether cluster node 202 is an active node of a clustered application. In other words, connectivity monitor 106(a) may determine whether cluster node 202 is currently configured to provide services for a clustered application.

At step 306 in FIG. 3, one or more of the systems described herein may, for each node in a set of cluster nodes, transmit from the cluster node to non-volatile RAM of a cluster disk, connectivity information that indicates the connectivity state of the cluster node. For example, splitter drivers 108(a) and 108(b) may transmit connectivity information of cluster nodes 202 and 204 to non-volatile RAM of cluster disk 206. As used herein, non-volatile RAM of a cluster disk generally refers to any type or form of random access memory which does not lose the data it stores when the cluster disk is turned off.

Splitter drivers 108(a) and 108(b) may transmit connectivity information in a variety of contexts. For example, splitter driver 108(a) may transmit connectivity information associated with cluster node 202 from cluster node 202 to cluster disk 206 by executing a Small Computer System Interface ("SCSI") command on cluster disk 206. For example, splitter driver 108(a) may execute a SCSI-3 command on cluster disk 206.

In some embodiments, splitter driver 108(a) may generate a dummy initiator identifier that includes the connectivity information, and splitter driver 108(a) may include the dummy initiator identifier in a TransportID field of a SCSI persistent reservation keys command. Splitter driver 108 may then execute the persistent reservation keys command on the cluster disk. As used herein, the phrase "SCSI persistent reservation key" generally refers to SCSI keys that may be used for I/O fencing and/or may resolve the issues of using SCSI reservations in a clustered SAN environment. For example, SCSI-3 persistent reservation keys may enable access for multiple nodes to a device and simultaneously block access for other nodes. SCSI-3 reservations may also support multiple paths from a host to a disk.

In some embodiments, SCSI persistent reservation keys commands may be used by one or more components of cluster node 202. In such embodiments, splitter driver 108(a) may trap the SCSI command before it is sent to cluster disk 206. In such embodiments, splitter driver 108(a) may include the dummy initiator identifier in the SCSI persistent reservation keys command by modifying the trapped SCSI command to include the dummy initiator identifier. In situations where SCSI commands are not used by other components of cluster node 202, splitter driver 108(*a*) may generate a SCSI persistent reservation keys command from scratch.

In some embodiments, splitter driver 108 (*a*) may execute the SCSI command on cluster disk 206 by generating a persistent reservation key that includes the connectivity information. In such embodiments, splitter driver 108 may register the persistent reservation key with cluster disk 206 to provide the connectivity information at cluster disk 206.

In other embodiments, splitter driver 108(*a*) may transmit the connectivity information from cluster node 202 to non-volatile RAM of cluster disk 206 by storing the connectivity information in a log storage section on non-volatile RAM of cluster disk 206. For example, splitter driver 108(*a*) and/or access module 110 may use a log select command (e.g., a command that modifies data in log pages of a SCSI device) and/or a log sense command (e.g., a command that obtains content from log pages in a SCSI device) to provide and access connectivity data on cluster disk 206. Connectivity data may be stored in any suitable types of log pages, including application log pages, dirty region logs ("DRLs"), statistics log pages, and performance log pages.

At step 308 in FIG. 3, or more of the systems described herein may access, from a remote system, the non-volatile RAM of the cluster disk to retrieve connectivity information of one or more cluster nodes from the set of cluster nodes. For example, access module 110 in data protection system 208 in FIG. 2 may access cluster disk 206 to retrieve connectivity information from connectivity information database 120. In other embodiments, a cluster monitor, such as cluster monitor 104(*a*) or cluster monitor 104(*b*), may access the non-volatile RAM of cluster disk 206 to determine the connectivity state of a node managed by cluster monitor 104.

At step 310 in FIG. 3, one or more of the systems described herein may use the connectivity information to inform the remote system of the connectivity state of one or more of the cluster nodes. In some embodiments, data protection system 208 may use the connectivity information to determine whether cluster node 202 has an active connection with data protection system 208. Alternatively, cluster monitor 104(*b*) may use the connectivity information to determine whether cluster node 202 is an active node of a clustered application.

As used herein, the phrase "remote system" generally refers to a system or device remote from the cluster disk that stores connectivity information. In some embodiments, the remote system may be data protection system 208, and access module 110 may use the connectivity information to inform data protection system 208 of the connectivity state of cluster node 202 and/or cluster node 204. In other embodiments, the remote system may be cluster node 204, and splitter driver 108(*b*) may use the connectivity information to inform cluster monitor 104(*b*) of the cluster status of cluster node 202.

The following discussion provides a detailed example of how the components of system 200 may implement the method presented in FIG. 3. In this example, cluster disk 206 may be any SCSI-3 capable disk that has a persistent keys database and non-volatile RAM. The non-volatile RAM may be accessible by any initiator (e.g., cluster node 202, data protection system 208, and/or cluster node 204) that can execute SCSI commands on the cluster disk. Using the TransportID field of a SCSI-3 persistent reservation keys command, splitter drivers 108(*a*) and 108(*b*) may store encoded state information as dummy initiators in the key database of cluster disk 206, thereby using the key database as a central store for supporting clustered applications (i.e., using the key database as connectivity information database 120).

In this example, cluster nodes 202 and 204 may represent a two node production cluster that uses cluster disk 206, and data managed by the cluster may be protected by data protection system 208. Splitter drivers 108(*a*) and 108(*b*) may be installed on cluster nodes 202 and 204 for tracking and capturing writes to cluster disk 206 from cluster nodes 202 and 204.

An administrator may connect to data protection system 208 and issue a command to start continuous data protection (or any other data protection process) for cluster disk 206. In response, data protection system 208 may verify that it can execute SCSI commands on cluster disk 206. Data protection system 208 may also check, by communication with splitter drivers 108(*a*) and 108(*b*), that cluster nodes 202 and 204 each have access to cluster disk 206 via at least one path. Data protection system 208 may also validate cluster disk 206 and may send a SCSI report capabilities command to verify that a Specify Initiator Ports Capable ("SIPC") bit is set on cluster disk 206.

Data protection system 208 may instruct splitter driver 108(*a*) and splitter driver 108(*b*) to start capturing writes to cluster disk 206 and sending a copy of those writes to data protection system 208. In response, splitter drivers 108(*a*) and 108(*b*) may configure themselves for capturing writes and may generate dummy initiator identifiers specific to the transport being used for cluster disk 206. For example, the dummy initiator identifier may be a World Wide Port Name ("WWPN") if cluster disk 206 is a Fibre Channel ("FC") LUN. Alternatively, the dummy initiator identifier may include an internet SCSI ("iSCSI") initiator name if cluster disk 206 is an iSCSI LUN.

The dummy initiator identifiers may be configured in a variety of ways. For example, splitter drivers 108(*a*) and 108(*b*) may provision three dummy initiator identifiers, ID1, ID2, and ID3. ID1 may indicate that the path between the cluster node (i.e., cluster node 202 or 204) and data protection system 208 is active and usable. ID2 may indicate that the path between the cluster node and data protection system 208 is in an invalid or error state. ID3 may indicate that data protection system 208 has read the state of the cluster node from cluster disk 206.

Continuing with the previous example, splitter driver 108 (*a*) may read existing SCSI persistent reservation keys on cluster disk 206 using a SCSI PR-IN command. If a persistent reservation key is registered, splitter driver 108(*a*) may issue a SCSI PR-OUT command with the SPECIFY INITIATOR bit set to 1 and may insert the relevant dummy initiator identifier into the TransportID field of the command (e.g., ID1 if the path between cluster node 202 and data protection system 208 is active, ID2 if the path between cluster node 202 and data protection system 208 is invalid). If a persistent reservation key is not already registered, splitter driver 108(*a*) may generate a temporary or private key, register the key, and then issue the SCSI PR-OUT command. In some embodiments, splitter driver 108(*a*) may start a continuous loop which registers, at regular intervals, ID1 or ID2 depending on the state of the connection between cluster node 202 and data protection system 208.

Splitter driver 108(*a*) may acknowledge completion of storing connectivity information to data protection system 208. Upon receiving this acknowledgement, data protection system 208 may start a continuous loop that issues, at regular intervals, SCSI PR-IN commands with service action READ FULL STATUS to obtain all the initiators registered in cluster disk 206. In response to the SCSI PR-IN command, cluster disk 206 may send the dummy initiator identifiers to data protection system 208.

If data protection system 208 detects ID1 for cluster node 202, data protection system may determine that the path between cluster node 202 and data protection system 208 is active. If data protection system 208 detects ID2 for cluster node 202, data protection system 208 may determine that the path between cluster node 202 and data protection system 208 has failed. If the path has failed, data protection system 208 may inform an administrator of the error condition, may provide any other notification, or may perform any other suitable remediation process. In some embodiments, after receiving either ID1 or ID2 for cluster node 202, data protection system 208 may deregister the dummy initiator identifier for cluster node 202 and may register dummy initiator ID3 to signify that the state transmitted by the splitter has been acknowledged by a backup appliance. If data protection system 208 does not receive ID1 or ID2 from the cluster disk 206 for a specified period, it may assume that cluster node 202 has lost connectivity to the cluster disk 206. In other words, if data protection system 208 does not receive new state information for cluster node 202 for a certain time period, data protection system 208 may assume that cluster node 202 has lost connectivity to cluster disk 206. Data protection system 208 may take appropriate remediation process in this case as well.

As noted, connectivity information may be used to inform a data protection system of a cluster node's connectivity to the data protection system and/or the cluster disk. In some embodiments, a cluster node may use a cluster disk to store connectivity information that indicates the cluster node's connectivity status to production storage (i.e., one or more production disks that may or may not include the cluster disk). In some embodiments, the cluster node may use one or more identifiers to indicate whether it has lost connectivity with all or a portion of production storage. For example, the cluster node may use an identifier for each production disk to indicate whether it has lost connectivity to each production disk.

A cluster monitor, during its normal operation, may register its own SCSI persistent reservation keys with a cluster disk. The following example shows how splitter drivers may implement the methods described herein without interfering with cluster monitor operation. Splitter driver 108(a) may trap a SCSI-3 PR-OUT register keys command executed by cluster monitor 104(a). Splitter driver 108(a) may then generate a new SCSI-3 operation that provide the same information as the trapped operation and also include a relevant dummy initiator identifier. Splitter drivers 108(a) may also set the SPECIFY INITIATOR PORTS bit in the SCSI command and may then execute this enhanced SCSI command. Any response to the enhanced SCSI command may be copied into the trapped SCSI command by splitter driver 108(a) and sent to cluster monitor 104(a). In such a scenario, rather than generating and using temporary keys, splitter driver 108(a) may rely on keys sent by cluster monitor 104(a).

Splitter driver 108(a) may also trap SCSI-3 READ FULL STATUS commands executed by cluster monitor 104(a). In these situations, splitter driver 108(a) may adjust the data returned in response to the READ FULL STATUS commands by removing its own dummy initiator identifiers and adjusting the length and/or size fields of the response buffers accordingly. Thus, cluster monitor 104(a) may only see the initiators registered by the cluster monitor itself.

Figure 4:
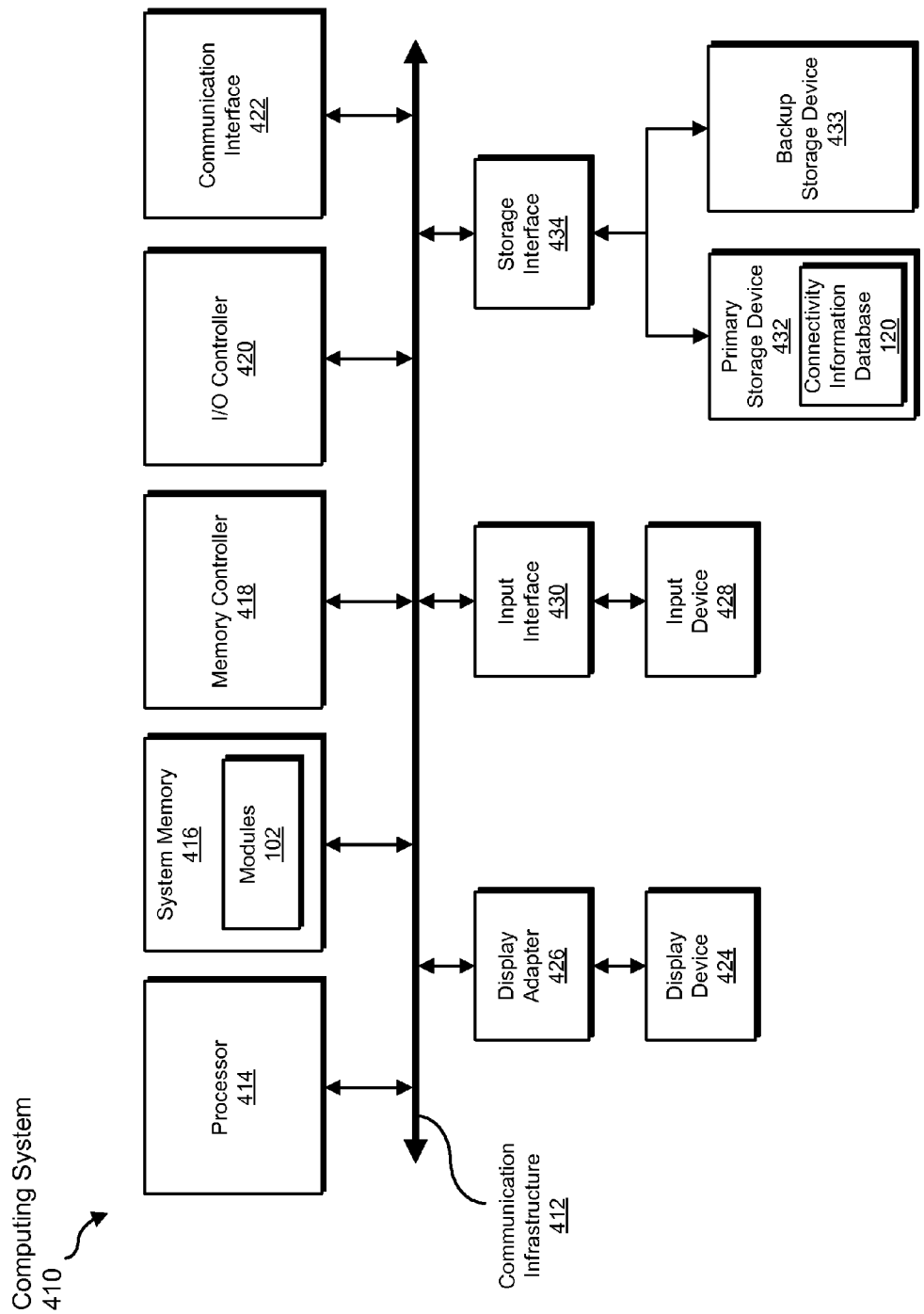
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the maintaining, determining, transmitting, accessing, using, generating, including, executing, trapping, modifying, registering, and storing steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller may perform and/or be a means for performing, either alone or in combination with other elements, one or more of the steps or features described and/or illustrated herein, such as maintaining, determining, transmitting, accessing, using, generating, including, executing, trapping, modifying, registering, and storing.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for performing, either alone or in combination with other elements, one or more of the maintaining, determining, transmitting, accessing, using, generating, including, executing, trapping, modifying, registering, and storing steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution. In certain embodiments, communication interface 422 may perform and/or be a means for performing, either alone or in combination with other elements, one or more of the maintaining, determining, transmitting, accessing, using, generating, including, executing, trapping, modifying, registering, and storing steps disclosed herein. Communication interface 422 may also be used to perform and/or be a means for performing other steps and features set forth in the instant disclosure.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the maintaining, determining, transmitting, accessing, using, generating, including, executing, trapping, modifying, registering, and storing steps disclosed herein. Input device 428 may also be used to perform and/or be a means for performing other steps and features set forth in the instant disclosure.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410. In one example, connectivity information database 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

In certain embodiments, storage devices 432 and 433 may be used, for example, to perform and/or be a means for performing, either alone or in combination with other elements, one or more of the maintaining, determining, transmitting, accessing, using, generating, including, executing, trapping, modifying, registering, and storing steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
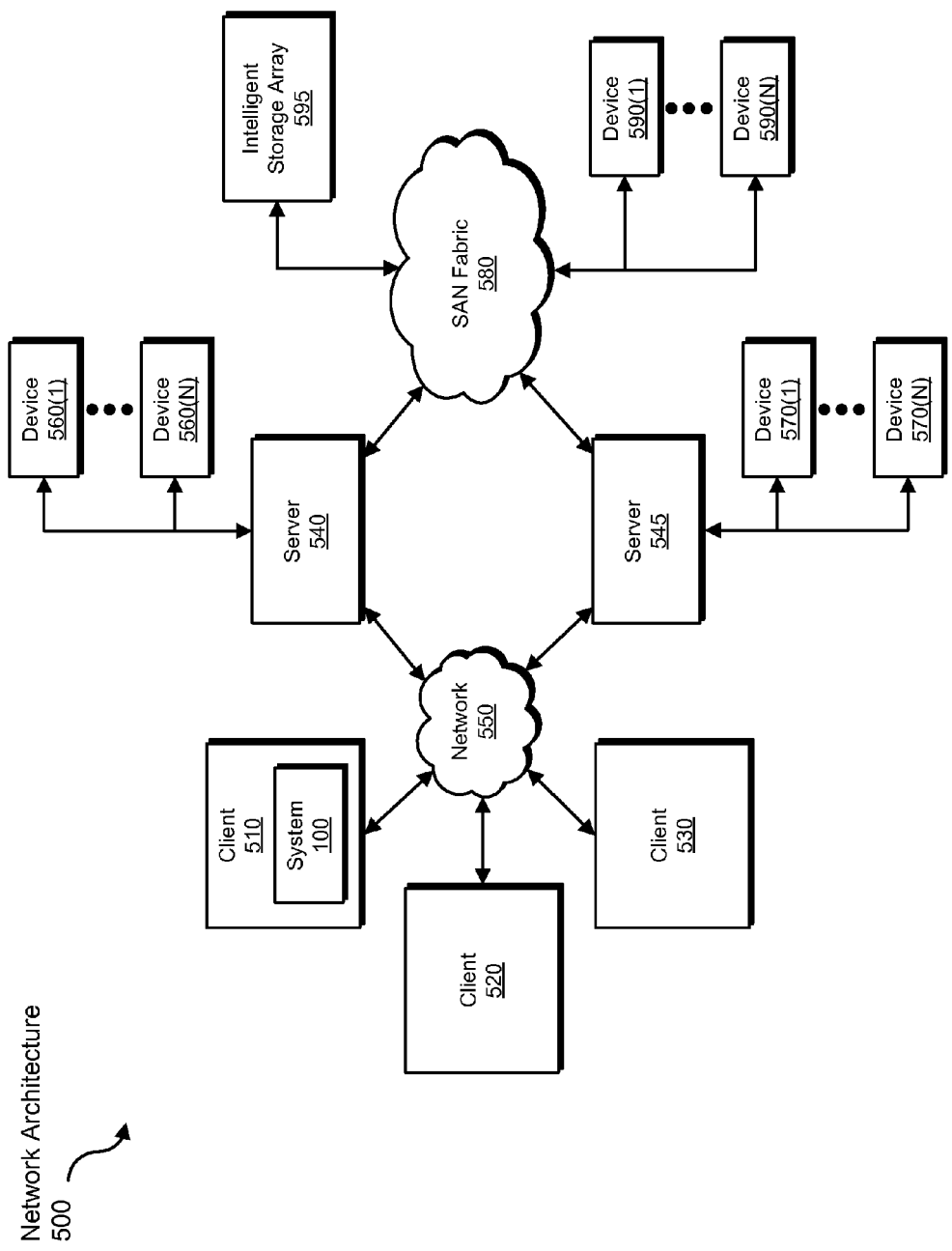
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. Client systems 510, 520, and 530 generally represent any type or form of computing device or system, such as exemplary computing system 410 in FIG. 4. In one example, client system 510 may include system 100 from FIG. 1.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550. Accordingly, network architecture 500 may perform and/or be a means for performing, either alone or in combination with other elements, one or more of the maintaining, determining, transmitting, accessing, using, generating, including, executing, trapping, modifying, registering, and storing steps disclosed herein. Network architecture 500 may also be used to perform and/or be a means for performing other steps and features set forth in the instant disclosure.

As detailed above, computing system 410 and/or one or more components of network architecture 500 may perform and/or be a means for performing, either alone or in combination with other elements, one or more steps of an exemplary method for managing cluster node connectivity information.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, a splitter driver may transform a SCSI persistent reservation command into a command that carries connectivity information of a cluster node. Furthermore, a splitter driver may transform the non-volatile RAM of a cluster disk into a database for storing cluster node connectivity information.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing cluster node connectivity information, at least a portion of the method being performed by a computing device comprising at least one processor, the method comprising:
   maintaining a set of cluster nodes of a clustered application;
   for each node in a set of cluster nodes:
      determining a connectivity state of the cluster node;
      transmitting, from the cluster node to non-volatile Random Access Memory ("RAM") of a cluster disk, connectivity information that indicates the connectivity state of the cluster node;
   accessing, from a remote system, the non-volatile RAM of the cluster disk to retrieve connectivity information of one or more cluster nodes from the set of cluster nodes;
   using the connectivity information to inform the remote system of the connectivity state of the one or more cluster nodes.

2. The method of claim 1, wherein:
   determining the connectivity state of the cluster node comprises determining whether the cluster node has an active connection with a data protection system;
   the remote system comprises the data protection system;
   the data protection system uses the connectivity information to determine whether the cluster node has an active connection with at least one of:
      the data protection system;
      production storage.

3. The method of claim 2, wherein:
   the data protection system comprises a continuous-data-protection appliance.

4. The method of claim 1, wherein:
   determining the connectivity state of the cluster node comprises determining whether the cluster node is an active node of the clustered application;
   the remote system comprises a cluster monitor;
   the cluster monitor uses the connectivity information to determine whether the cluster node is an active node of the clustered application.

5. The method of claim 1, wherein:
   transmitting the connectivity information from the cluster node to the non-volatile RAM of the cluster disk comprises executing a Small Computer System Interface ("SCSI") command on the cluster disk.

6. The method of claim 5, wherein executing the SCSI command on the cluster disk comprises:
   generating a dummy initiator identifier that comprises the connectivity information;
   including the dummy initiator identifier in a TransportID field of a SCSI persistent reservation keys command;
   executing the SCSI persistent reservation keys command on the cluster disk.

7. The method of claim 6, further comprising:
   trapping the SCSI command as the SCSI command is sent from a cluster monitor to the cluster disk, wherein including the dummy initiator identifier in the SCSI persistent reservation keys command comprises modifying the trapped SCSI command to include the dummy initiator identifier.

8. The method of claim 6, further comprising:
   generating the SCSI persistent reservation keys command.

9. The method of claim 5, wherein executing the SCSI command on the cluster disk comprises:
   generating a persistent reservation key that comprises the connectivity information;
   registering the persistent reservation key with the cluster disk.

10. The method of claim 1, wherein:
    transmitting the connectivity information from the cluster node to the non-volatile RAM of the cluster disk comprises storing the connectivity information in a log storage section of the non-volatile RAM of the cluster disk.

11. A system for managing cluster node connectivity information, the system comprising:
    a cluster monitor programmed to manage a set of cluster nodes of a clustered application;
    in each node in the set of cluster nodes, a connectivity monitor programmed to determine a connectivity state of the cluster node;
    in each node in the set of cluster nodes, a splitter driver programmed to transmit, from the cluster node to non-volatile Random Access Memory ("RAM") of a cluster disk, connectivity information that indicates the connectivity state of the cluster node;
    an access module programmed to:
       access, from a remote system, the non-volatile RAM of the cluster disk to retrieve connectivity information of one or more cluster nodes from the set of cluster nodes;
       use the connectivity information to inform the remote system of the connectivity state of the one or more cluster nodes;
    one or more processors configured to execute the cluster monitor, the connectivity monitor, the splitter driver, and the access module.

12. The system of claim 11, wherein:
    the connectivity monitor is programmed to determine the connectivity state of the cluster node by determining whether the cluster node has an active connection with a data protection system;
    the remote system comprises the data protection system;
    the data protection system includes the access module, which is programmed to use the connectivity information to determine whether the cluster node has an active connection with the data protection system.

13. The system of claim 11, wherein:
the connectivity monitor is programmed to determine the connectivity state of the cluster node by determining whether the cluster node is an active node of the clustered application;
the remote system comprises the cluster monitor;
the cluster monitor uses the connectivity information to determine whether the cluster node is an active node of the clustered application.

14. The system of claim 11, wherein:
the splitter driver is programmed to transmit the connectivity information from the cluster node to the non-volatile RAM of the cluster disk by executing a Small Computer System Interface ("SCSI") command on the cluster disk.

15. The system of claim 14, wherein the splitter driver is programmed to execute the SCSI command on the cluster disk by:
generating a dummy initiator identifier that comprises the connectivity information;
including the dummy initiator identifier in a TransportID field of a SCSI persistent reservation keys command;
executing the SCSI persistent reservation keys command to the cluster disk.

16. The system of claim 15, wherein:
the splitter driver is further programmed to trap the SCSI command as the SCSI command is sent from a cluster monitor to the cluster disk;
the splitter driver is programmed to include the dummy initiator identifier in the SCSI persistent reservation keys command by modifying the trapped SCSI command to include the dummy initiator identifier.

17. The system of claim 16, wherein the splitter driver is further programmed to:
generate the SCSI persistent reservation keys command.

18. The system of claim 16, wherein the splitter driver is programmed to execute the SCSI command on the cluster disk by:
generating a persistent reservation key that comprises the connectivity information;
registering the persistent reservation key with the cluster disk.

19. The system of claim 11, wherein:
the splitter driver is programmed to transmit the connectivity information from the cluster node to the non-volatile RAM of the cluster disk by storing the connectivity information in a log storage section of the non-volatile RAM of the cluster disk.

20. A non-transitory computer-readable-storage medium comprising one or more computer-executable instructions that, when executed by at least one processor of a computing device, cause the computing device to:
maintain a set of cluster nodes of a clustered application;
for each node in a set of cluster nodes:
determine a connectivity state of the cluster node;
transmit, from the cluster node to non-volatile Random Access Memory ("RAM") of a cluster disk, connectivity information that indicates the connectivity state of the cluster node;
access, from a remote system, the non-volatile RAM of the cluster disk to retrieve connectivity information of one or more cluster nodes from the set of cluster nodes;
use the connectivity information to inform the remote system of the connectivity state of the one or more cluster nodes.

* * * * *